(12) United States Patent
Kamel et al.

(10) Patent No.: US 9,896,944 B2
(45) Date of Patent: Feb. 20, 2018

(54) FORMING A SECONDARY STRUCTURE DIRECTLY ONTO A TURBINE BLADE (71) Applicant: Siemens Energy, Inc., Orlando, FL (US)

(72) Inventors: Ahmed Kamel, Orlando, FL (US); Gerald J. Bruck, Oviedo, FL (US); Dhafer Jouini, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 610 days.

(21) Appl. No.: 14/256,446

(22) Filed: Apr. 18, 2014

(65) Prior Publication Data
US 2015/0300179 A1 Oct. 22, 2015

(51) Int. Cl.
B23K 15/00 (2006.01)
B23K 26/00 (2014.01)
F01D 5/22 (2006.01)
F01D 5/12 (2006.01)
B22F 3/105 (2006.01)
B22F 5/04 (2006.01)
B22F 7/08 (2006.01)
B33Y 10/00 (2015.01)
B33Y 80/00 (2015.01)
B22F 7/06 (2006.01)

(52) U.S. Cl.
CPC ............ F01D 5/22 (2013.01); B22F 3/1055 (2013.01); B22F 5/04 (2013.01); B22F 7/08 (2013.01); B23K 15/0006 (2013.01); F01D 5/12 (2013.01); B22F 2007/068 (2013.01); B33Y 10/00 (2014.12); B33Y 80/00 (2014.12); F05D 2230/31 (2013.01); Y02P 10/295 (2015.11)

(58) Field of Classification Search
CPC ......... B33Y 10/00; B33Y 80/00; B33Y 40/00; B23K 15/0006; Y02P 10/295
See application file for complete search history.

(56) References Cited

U.S. PATENT DOCUMENTS

| | | | |
|---|---|---|---|
| 7,521,652 B2 * | 4/2009 | Chung | B22F 3/1028 219/121.84 |
| 2003/0075587 A1 * | 4/2003 | Smashey | B23K 31/02 228/119 |
| 2008/0135530 A1 | 6/2008 | Lee et al. | |
| 2011/0135952 A1 * | 6/2011 | Morris | B22F 3/1055 419/9 |
| 2012/0285933 A1 * | 11/2012 | Arjakine | C30B 13/22 219/76.1 |
| 2013/0276455 A1 | 10/2013 | Fisk et al. | |

(Continued)

FOREIGN PATENT DOCUMENTS

CN 103068516 A 4/2013
EP 1637274 A1 3/2006
(Continued)

Primary Examiner — Geoffrey S Evans (57) ABSTRACT

A process and apparatus for solid freeform fabrication and repair of components on existing bodies (such as turbine blades), the innovative process and apparatus as well as the resultant product having the following advantages: a) Can build on existing 3-D surfaces. Not limited to horizontal flat surfaces, b) Usable for metals that are difficult to weld. c) Robust process that is adaptable to new damage modes. d) No shielding of the melt pool by inert gas is needed. e) Wide range of powder sizes.

15 Claims, 4 Drawing Sheets (56) References Cited

U.S. PATENT DOCUMENTS

| | | | | |
|---|---|---|---|---|
| 2013/0280092 A1* | 10/2013 | Xu | ............... | F01D 5/187 |
| | | | | 416/97 R |
| 2014/0123890 A1* | 5/2014 | Arjakine | ............ | C30B 11/10 |
| | | | | 117/12 |
| 2014/0154088 A1* | 6/2014 | Etter | ............ | B23K 15/0086 |
| | | | | 416/223 R |
| 2014/0163717 A1* | 6/2014 | Das | ............ | B22F 3/1055 |
| | | | | 700/119 |

FOREIGN PATENT DOCUMENTS

| | | |
|---|---|---|
| EP | 2620594 A1 | 7/2013 |
| KR | 10-2012-0064128 A | 6/2012 |

\* cited by examiner

FORMING A SECONDARY STRUCTURE DIRECTLY ONTO A TURBINE BLADE

FIELD OF THE INVENTION

This invention relates to the field of forming a turbine blade auxiliary component directly onto the turbine blade, and particularly to forming a snubber directly onto the turbine blade wherein the snubber properties and structure conform to the properties and structure of the turbine blade.

BACKGROUND OF THE INVENTION

In power generation, turbine blades are subjected to a demanding range of performance requirements including withstanding high temperatures and temperature fluctuations, high pressures, high speed rotation, vibrational loading/stress, metal fatigue, irregular part geometry, and nearly uninterrupted turbine engine usage. Coincidentally, auxiliary blade components, such as blade snubbers, are also challenged to endure these extreme operating conditions.

In turbine engines snubbers are provided as an interface between pairs of blades and help to minimize the vibrational loading and stresses experienced by the blades. Snubbers provide additional stiffness to the blades which in turn impacts the blade design options—such as allowing for reduced axial blade width or optimization of the blade frequency response. Snubbers are designed and selected to function in the extremely demanding operating environment of the turbine blade.

Typical methods of forming and joining machine parts presents limitations constraining the use of these techniques in forming snubbers and in integrating snubbers with turbine blades. For example, some methods require excavating portions of the turbine blade before adding on material used to construct a snubber. These excavated areas present modifications to the original blade design which range from changing the overall aerodynamics of the blade to introducing reductions in the structural integrity of the blade.

Other methods of forming and joining machine parts involve subjecting the blade and snubber to high temperatures, such as via the use of a welding process, which consequentially, may alter the physical characteristics of the blade.

Since, overall, snubbers are used to enhance turbine engine performance, there is a need optimize both the design of the snubber, the composition of the snubber, as well as the techniques used to attach the snubber onto the turbine blade.

BRIEF DESCRIPTION OF THE DRAWINGS

The invention is explained in the following description in view of the drawings that show.

DETAILED DESCRIPTION OF THE INVENTION

The present inventors have developed a method of forming a secondary structure on to the surface of a cast metal component by melting successive layers of metal powder on to the cast metal component using a directed energy beam wherein the melting does not encompass a full grain depth of the cast metal component.

Particularly, the present inventors have developed a method of forming a snubber directly onto a directionally solidified cast turbine blade wherein the snubber properties and structure conforms to or matches the properties and structure of the turbine blade. Consequently, the inventors have developed a turbine blade snubber with mechanical properties which are custom matched to or aligned with mechanical properties of the host turbine blade.

Advantageously and particularly the turbine blade plus snubber combination developed by the inventors includes a common grain orientation at least at their union thereby maintaining the mechanical properties of the turbine blade.

For directionally solidified single crystal superalloy turbine blades, the inventors have recognized the benefit of adding auxiliary components to the turbine blade while preserving the blade grain orientation achieved during casting of the turbine blade.

As discussed above, while attaching auxiliary components, such as snubbers, to a turbine blade has been accomplished using a variety of techniques such as welding, using these techniques to form a snubber directly on the turbine blade usually results in a degradation of the blade's mechanical properties such as undesired reorientation of the blade's directional solidification and reduction in blade wall thickness.

The present inventors have developed a process and apparatus for solid freeform fabrication and repair of components on existing bodies (such as turbine blades), the innovative process and apparatus as well as the resultant product having the following advantages:

a) Can build on existing 3-D surfaces. Not limited to horizontal flat surfaces.
b) Usable for metals that are difficult to weld.
c) Robust process that is adaptable to new damage modes.
d) No shielding of the melt pool by inert gas is needed.
e) Wide range of powder sizes.

An unbounded metal powder compound or a preform of metal powder and other constituents such as flux powder is created that contains metal to be added to a component (such as a blade snubber) being additively fabricated or repaired.

"Unbound" means loose, as opposed to consolidated, compacted, and/or sintered together into a block or other self-supporting form. A benefit of unbound particles is that laser energy penetrates to a greater depth by reflection between the particles than with a solid preform such as is described later herein. The particles may constitute respective metal and flux particles mixed in a pre-determined volume ratio, or the particles may constitute metal particles coated with or containing flux, such as are described in United States patent application publication US 2013/0136868 dated 30 May 2013, incorporated by reference herein.

The selected metal powder(s) (provided via the compound or preform) may be constrained in a distribution that defines a shape of a layer or slice of the component, such as a blade snubber or other turbine component.

The metal powder compound or metal powder preform is preplaced on a component surface for repair, or a previous layer.

The compound or preform is then melted by a directed energy, such as a laser beam or other form of energy. This forms a layer of metal and an over-layer of slag that shields and insulates the layer during processing. The slag is then removed, and a subsequent layer may be added.

Figure 1:
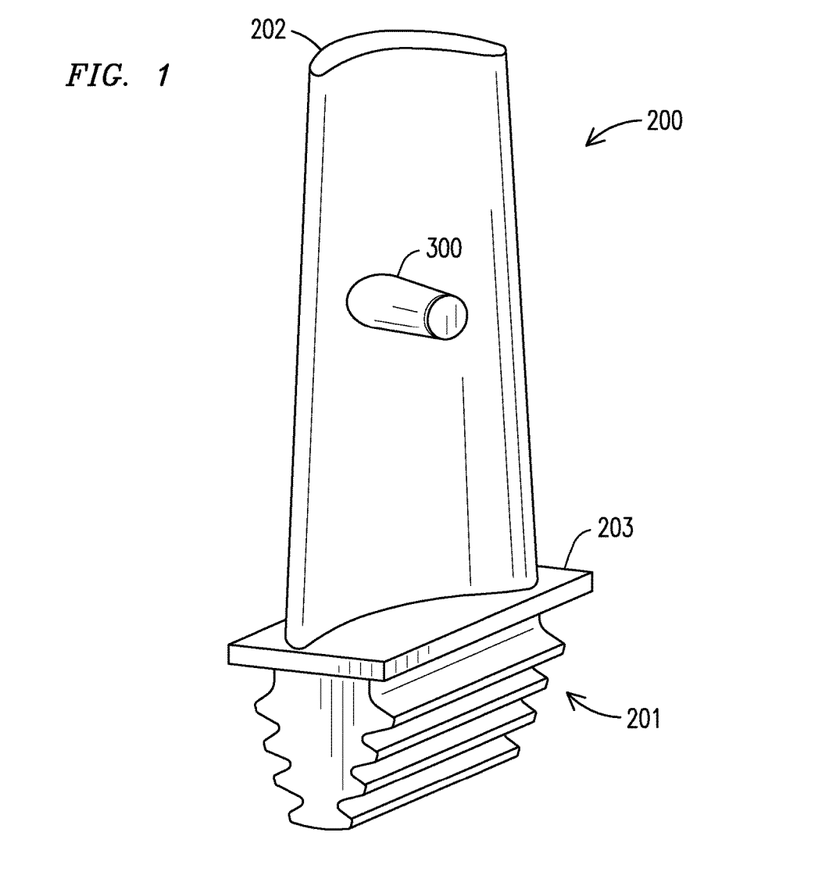
FIG. 1 illustrates a turbine blade with a snubber provided near the mid-span.

Referring to the figures, FIG. 1 shows a turbine blade 200 with a snubber 300 positioned near its midspan. The blade 200 (or airfoil) generally includes at least a blade root 201, a blade tip portion 202, and a blade platform 203.

Figure 2:
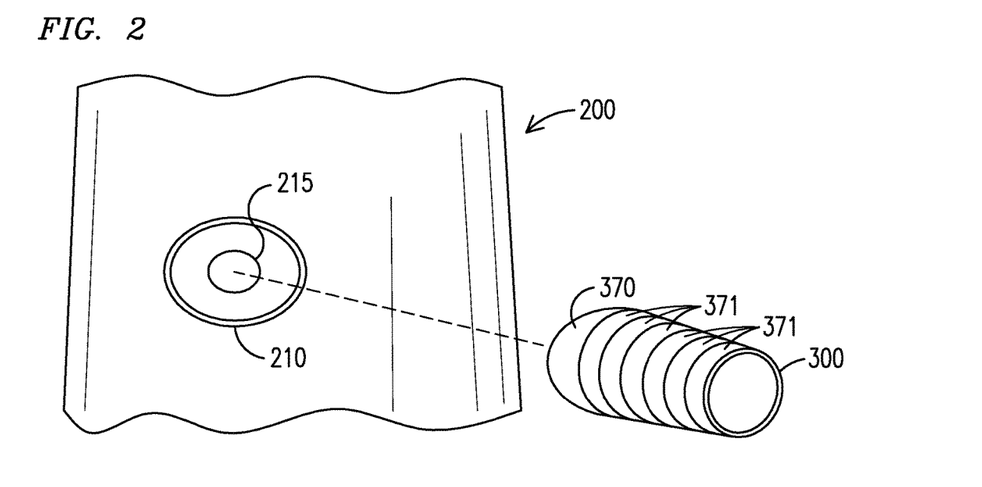
FIG. 2 presents an exploded view indicating the snubber positioning on the turbine blade.

FIG. 2 presents an exploded view indicating the snubber 300 positioning on the turbine blade 200. As shown, the turbine blade 200 includes an opening 215 formed in the surface or wall 210 of the blade 200. The blade 200 may be formed by known methods such as investment casting and the blade 200 may be hollow, for example, to minimize blade weight or to provide a path for fluid flow such as airflow.

Figure 5A:
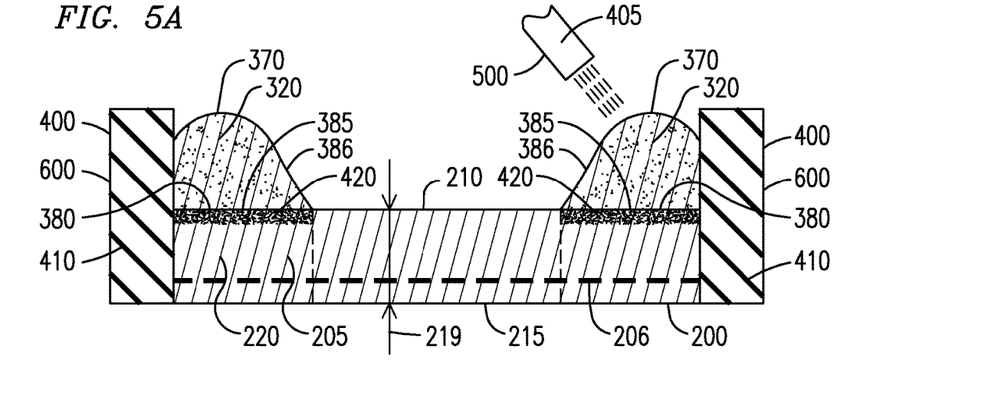
FIG. 5A is a side view of a snubber layer under formation on a single grain blade.
Figure 5B:
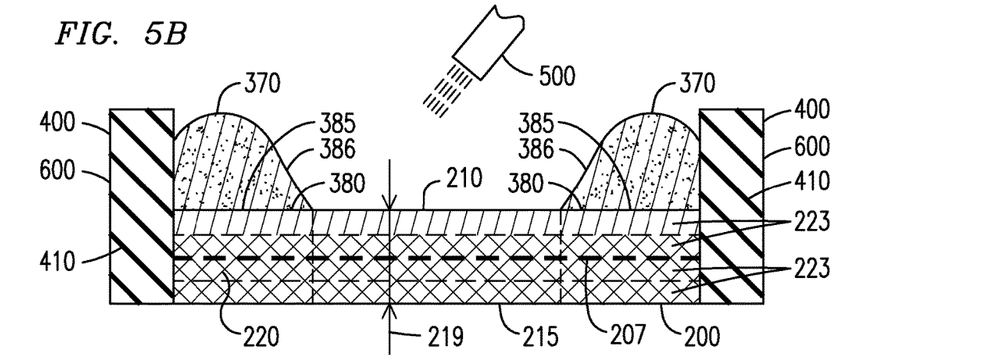
FIG. 5B is a side view of a snubber layer under formation on a multiple grain blade.
Figure 6:
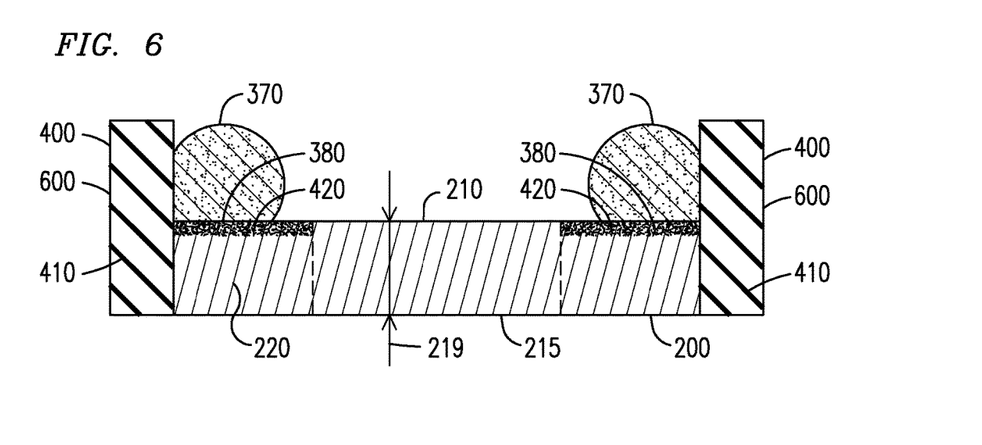
FIG. 6 is a side view of a snubber layer being formed on a single grain blade.
Figure 7:
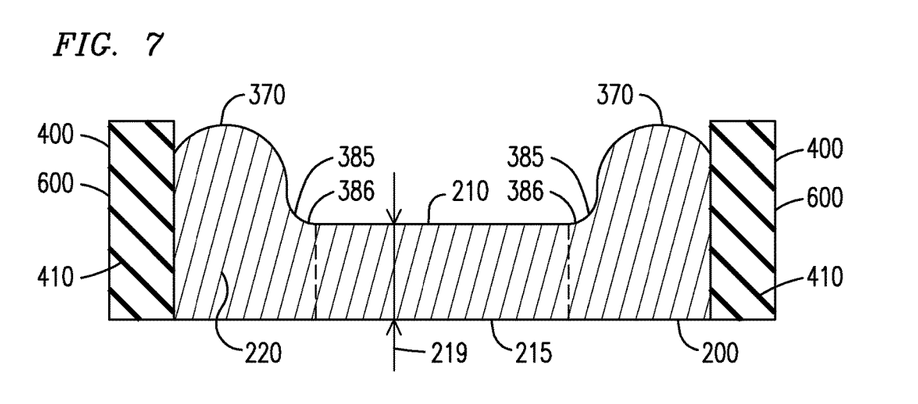
FIG. 7 is a side view of a snubber layer formed on to a single grain blade.
Figure 8:
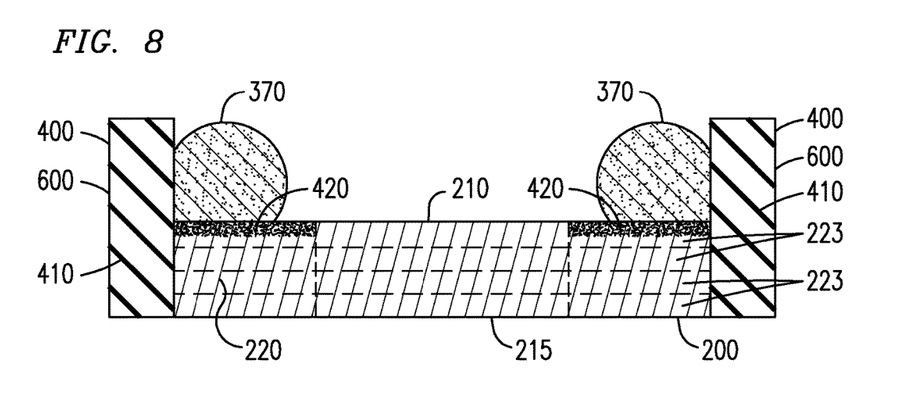
FIG. 8 is a side view of a snubber layer being formed on a multiple grain blade.
Figure 9:
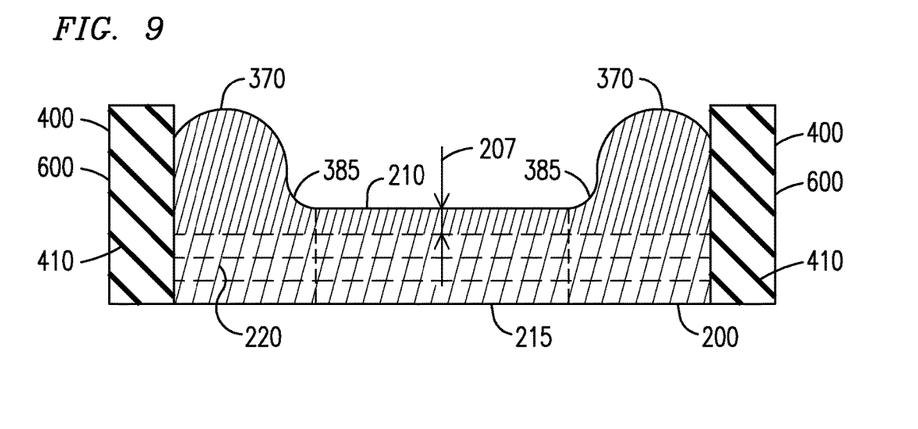
FIG. 9 is a side view of a snubber layer formed on to a multiple grain blade.

Further the blade 200 can be formed to include a selected directionally solidified grain pattern 220 or a preferred blade grain structure 220, as shown in FIG. 5A thru FIG. 9. The blade may be cast with a single crystal grain structure 220 as shown in FIGS. 5A, 6, and 7. The blade may be cast with a multiple crystal grain structure 220 as shown in FIGS. 5B, 8, and 9. The grain structure of the blade (including a single crystal structure or multi-crystal structure) may extend from the blade root 201 or platform 203 toward the tip portion 202 of the blade (or airfoil) 200.

As explained in more detail below, the snubber 300 may be constructed to match or correspond to the blade grain structure 220. The snubber 300 generally begins with a snubber first layer 370 formed from a deposit of metal powder and may include other constituents, such as insulator material, flux material, or other additives such as dry ice.

The grain orientation 320 of the snubber first layer 370 adjacent the surface 210 of the blade 200 may be matched to the blade grain structure 220.

As shown in FIG. 2, beyond the snubber first layer 370, the snubber may comprise additional or subsequent layers 371. The grain orientation of subsequent layers 371 of the snubber 300 may be created in a fashion similar to the crafting the grain orientation structure 320 of the snubber first layer 370. Alternatively the grain orientation of the subsequent layers 371 may be formed via a unique method selected to impart the desired mechanical properties to the layer.

Selectively generating a grain structure 320 of the snubber layers 370, 371 that matches the blade grain structure 220 is further accomplished by controlling the direction and intensity of the heat transfer and cooling of the snubber layers 370, 371 as they are subjected to a directed energy beam 500, as shown in FIGS. 5A and 5B, and subsequently cooled and solidified.

For example the grain structure 320 of the snubber under formation may be selected to be parallel to the blade grain structure 220 as shown in FIG. 5A.

Control of the direction and intensity of the heat transfer and cooling experienced by the snubber layers 370, 371 may be accomplished in part by selectively using various system vectors 405 (as used here the system vectors encompass energy beam parameters including path, intensity, and duration, as well as programmed and computed functions and algorithms, among others).

In conjunction with applying optimized system vectors 405, laser blocking elements and material 400 (including insulation material 410 and flux material 420), referred to herein also as heat transfer control elements 400, are selectively placed onto the blade surface 210 or other locations related to the applicable snubber layer 370, 371 to affect the formation of the subsequent snubber layer 371.

Heat transfer control material 400 having high thermal conductivity, such as graphite, induce a fine grain structure in the solidified metal powder or preform by promoting fast cooling. A laser-blocking material 400 with low thermal conductivity, such as zirconia, may be useful to induce directional solidification in the snubber by limiting a direction of heat removal to be primarily in a direction of a preferred grain orientation 320 of the snubber 300. Thus, the grain structure of the metal in the snubber 300 can be customized and varied over the component body by selection of the surrounding heat transfer control materials 400.

Utilizing the heat flow control elements 400, heat transfer from the directed energy beam to the cast metal component (such as the blade 200) and the secondary structure (such as the snubber 300 under formation) can be closely controlled to pull heat out of the solidifying metal and achieve a preferential grain growth in the secondary structure. As a result, for example, the heat transfer can be control such that the melting of the metal powder does not encompass a full grain depth of the cast metal component.

Using this approach it is possible, for example, to maintain a well-defined transition from columnar (directional) grain structures to equiaxed in subsequent snubber layers 371, thus providing a snubber having layers 370 and 371 encompassing both columnar and equiaxed grain structure features in specific areas of the same snubber. This allows for any desired combination of grain structures to be imparted to the snubber 300.

The snubber 300 may have a single crystal grain structure at the first layer 370 where the snubber is joined to the single crystal structure of the blade 200, and thereafter subsequent snubber layers 371 may have an equiaxed grain structure, and other subsequent snubber layers 371 can have columnar grain structures.

Figure 3:
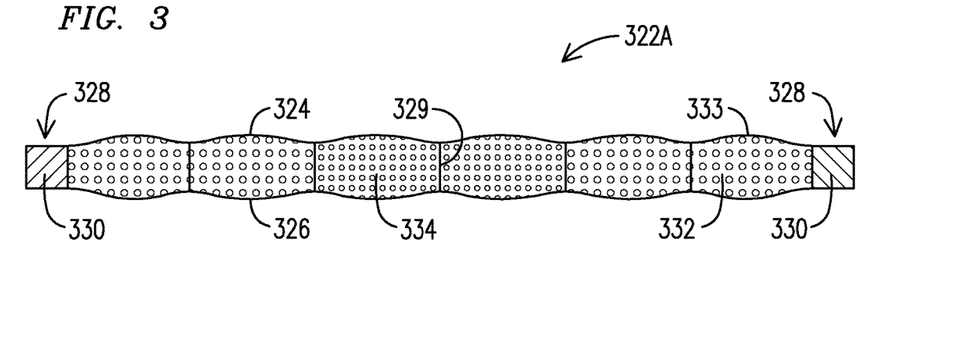
FIG. 3 is a side sectional view of a preform showing aspects of an embodiment of the invention.

FIG. 3 is a side sectional view of a preform 322A showing aspects of an embodiment of the invention. More particularly, FIG. 3 shows a sectional side view of a preform 322A (such as a preform configured as a snubber first layer 370) embodied as a closed container such as a bag, envelope, sleeve, or tube containing unbound particles of metal 332, 334 and flux 333.

The container has walls 324, 326 with a sealed periphery 328. The walls may be sheets of any type, such as fabric, film, or foil that retains the powder. The sheets may be made of a material that does not create detrimental smoke and ash, and may contribute to the flux, such as aluminum foil, or a fabric of alumina or silica fibers. The container may be quilted or subdivided by partitions 329 to retain a particle distribution that creates a desired shape of the metal layer in response to the energy beam. Such partitions 329 may also be useful for out-of-position (non-flat) material deposition applications. Some variation in thickness of the preform is tolerable, since the melt pool is self-leveling to some extent. The partitions may provide compartments of particles 332, 334 of different sizes and/or different materials optimized for varying requirements over the section of the component. Larger particle sizes may be provided for larger structural features, and smaller particle sizes may be used for smaller, more detailed structural features. A fabric-walled compartment may have a mesh size appropriate for retaining a respective particle size and may be varied accordingly across a preform, as appropriate, or it may be lined, such as with aluminum foil, to retain fine powdered particles. The aluminum then becomes a constituent of the alloy melt.

Optionally, the periphery 328 may include a non-metallic, non-melting, laser blocking material 400, 330 such as graphite or zirconia, which provides an energy absorbing turn-around area for the laser scan lines outside the melt pool. This avoids excess heating of the periphery of the layer. The laser-blocking material 330 may form a solid peripheral frame to which the peripheries 328 of the walls 324, 326 may be attached with high-temperature cement. Such a frame provides a highly defined outer surface of the fabricated component.

Optionally, particles of dry ice may be mixed with the particles 332 of metal and flux or may be contained in a peripheral or interior compartment in place of, or in addition to, the laser blocking material 330 to control heating and to supply an oxidation shield of $CO_2$ gas.

Figure 4A:
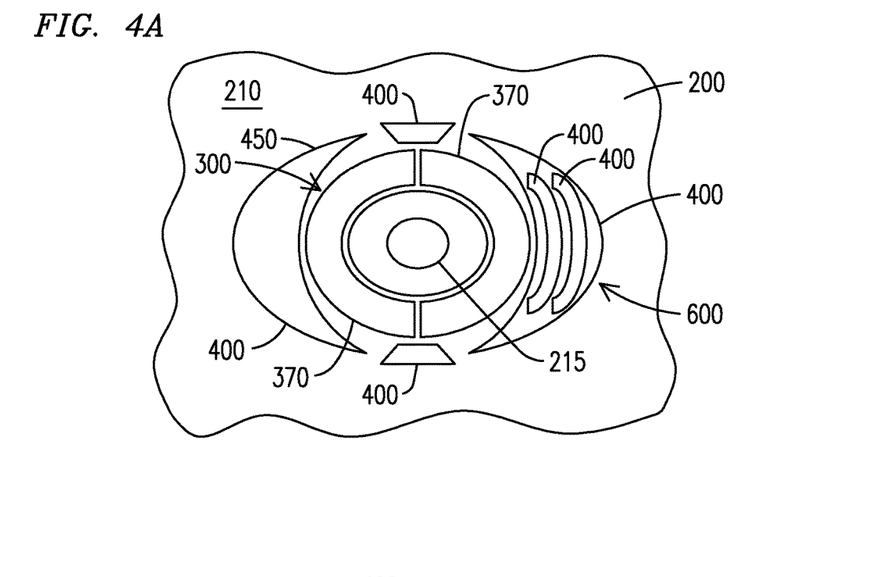
FIG. 4A is a top view of a layer of a snubber.
Figure 4B:
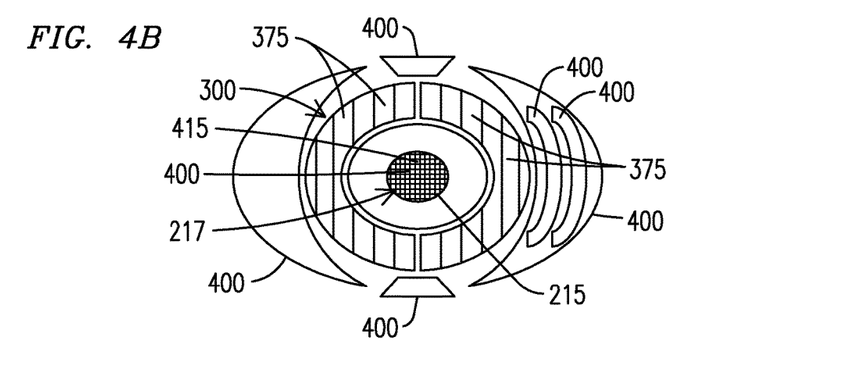
FIG. 4B is a top view of a layer of a snubber.

FIGS. 4A and 4B present a top view of a snubber 300 to be formed on a turbine blade 200 by an embodiment of the present process and apparatus. To achieve proper grain formation of the snubber 300, such as to achieve a specified grain pattern, heat flow control elements 400 are positioned in select locations 450 about the opening 215 in the blade surface 210.

Material selected to form the snubber first layer 370 is also positioned about the opening 215 in the blade surface 210. Insulating material 410 and flux material 420 of the heat flow control elements 400 are selected to effectuate the desired heat transfer of the constituents of the snubber first layer 370 necessary for achieving the desired grain structure of the snubber first layer 370. The snubber segments 375 contain the metal powder composition necessary for creating unique portions of the snubber layer 370.

Subsequent snubber layers 371 are comprised of snubber segments 375 selected for creating additional subsequent snubber layers 371.

As shown, heat flow control elements 400 are provided in various locations as needed to direct the heat transfer towards the desired direction. The heat flow control elements 400 and the associated fabrication components 600 may be positioned in discrete locations around the segmented snubber layer 370 or even placed atop other heat flow control elements 400.

With the snubber layer 370 and heat flow control elements 400 positioned as desired, a system vector 405 is applied which selectively applies the directed energy beam to the snubber layer 370 and heat flow control elements 400 to generate the chosen grain pattern in the snubber under formation.

The snubber layer 370 may include shaped sections of large particles as well as smaller particles and any combination therefore to form the segment. It may further contain laser-blocking borders or directed energy beam blockers 400 such as graphite for laser turn-around areas. It may also contain interior laser-blocking sections 400 to provide high definition of the interior surfaces of the component and control the grain structure.

Graphite does not adhere to metal, so the laser-blocking sections 400 can be easily removed after laser processing of each layer. The laser blocking sections may be particulate or solid. Optionally, the laser-blocking sections may be allowed to accumulate layer by layer until fabrication is complete, so that each laser-blocking section is supported on the previous laser-blocking sections. Solid laser-blocking sections may have a registration feature such as protrusions on an upper surface and depressions on the lower surface thereof to register the current preform relative to the previous one.

As shown in FIG. 4B, the heat flow control elements 400 may be positioned within the opening 215 in the blade surface 210 and may be composed of a grid like structure 217 where heat flow is directionally controlled based on the properties of each grid cell 415 as well as the vector settings 405 selected for imparting directed energy to individual grid cells 415.

As shown in FIG. 5A, the blade presents a grain pattern 220 achieved during casting of the blade 200. The snubber first layer 370 is induced to replicate the blade grain pattern 220, in part, through the controlled transfer of heat flowing into, out of and through the snubber first layer 370 thereby effectuating the systematic heat flow control provided by the heat flow control elements 400. Specifically, the heat flow control elements 400 are configured to help impart the dendrite grain structure of the blade 200 to at least the first layer 370 of the snubber 300.

FIG. 5A is a side view of an embodiment designed to create a first layer 370 of the snubber of FIG. 4. The side view shows a layer of metal powder forming the snubber first layer 370 positioned on the surface 210 of the turbine blade 200. As shown, the flux 420 can optionally be deposited to help form a wetted junction 380 between the blade surface 210 and the snubber first layer 370 at a metallurgical joint 385 between the blade 200 and the snubber 300. As the metal powder of the snubber first layer 370 melts, a meniscus 386 may be formed at the wetted junction where the melted metal powder of the snubber first layer 370 converges with the blade surface 210.

Importantly, the wetted junction 380 provides for optimized heat transfer between the blade surface 210 and the snubber first layer 370 without the need for excavating a portion of the blade surface 210 as is traditionally done. As shown in FIG. 5A the metal powder of the snubber first layer 370 is being melted to form a snubber layer having the single grain pattern of the underlying turbine blade 200. Note—any of the embodiments disclosed herein may include the wetted junction 380.

As shown in FIG. 5A, with precise placement of the heat flow control elements 400 as well as the uniquely configured snubber layer 370, only a fraction 206 of a full grain depth 219 of the blade 200 may be subjected to the melting of the metal powder and the heat of the directed energy beam. This allows the remaining grain structure to remain undisturbed. Thus, melting of the metal powder does not encompass a full grain depth 219 of the cast metal component 200. In some embodiments where the turbine blade wall is only one grain thick, the melting proceeds to less than that full grain depth. In some embodiments where the turbine blade wall is multiple grains in thickness, the melting proceeds to less than all of the multiple grains. Advantageously, at least some of the as-cast grain structure of the wall remains un-melted during the deposition of the snubber.

A grain structure 320 of the snubber under formation may be generated which is parallel to the blade grain structure 220 without disturbing the blade grain structure 220 as-cast. At least the first layer 370 of the metal powder deposited onto the blade 200 can have directionally solidified grains 320 oriented parallel to the grains 220 of the blade wall 210 as shown in FIG. 5A.

Additionally, where the snubber 300 is formed of successive layers 371, melting of the successive layers 371 does not melt and reform a full thickness 219 of the underlying blade wall 210.

This precise control of the preferential direction of heat transfer allows the snubber 300 to be formed on the wall 210 of the blade 200 while limiting the metallurgical joint 385 to extending less than a full thickness of the blade wall 210, which preserves the as-cast grain structure 220 of the blade wall 210 under the metallurgical joint 385.

The system vector settings 405, the heat flow control elements 400, and the snubber layer properties cooperate to provide for the formation of a snubber 300 which has physical characteristics and mechanical properties, such as grain structure, related to the properties of the host turbine blade.

FIG. 5B is a side view of an embodiment designed to create a layer 370 of the snubber of FIG. 4 on to a turbine blade having a multiple grain structure. The side view shows a layer of metal powder forming the snubber first layer 370 positioned on the surface 210 of the turbine blade 200. The as-cast grain structure 220 of the blade wall is a directionally solidified grain structure having a thickness of a plurality of grains 223 extending from the blade root 201 to the blade tip 202 and the metallurgical joint 385 does not extend into all of the plurality of grains 223.

As shown in FIG. 5B, with precise placement of the heat flow control elements 400 as well as the uniquely configured snubber layer 370, only a fraction 207 of the plurality of grains 223 is subjected to the directed energy beam. This allows the remaining grain structures 223 to remain undisturbed or un-encompassed by the melting of the metal powder. Further, this configuration allows the transfer of the dendrite formation of the blade's crystalline structure to the snubber under formation with minimal re-orientation of only a portion of the blade's crystalline structure 220.

Initially, a snubber layer first layer 370 (formed of a selected composition of metal powder or a preform composition) having the desired features is positioned around the blade opening 215 along with associated fabrication components 600 (such as support structures, spacers, or voids). The snubber first layer 370 and associated fabrication components 600 are subjected to the energy beam to melt metal powder forming the snubber first layer 370 and to facilitate heat transfer in the desired direction. This induces the desired grain structure 320 in at least the snubber layer first layer 370 which appropriately corresponds to the grain structure 220 present in the turbine blade 200.

As shown in FIG. 6, in forming a snubber to correspond to a turbine blade 300 having a single grain thickness 219, the metal powder of the snubber first layer 370 is placed on the surface of the turbine blade 210. Optionally, flux may be applied to the metal powder and the blade surface to help control heat transfer.

As shown in FIG. 7, consistent with the system vector settings 405 and the configuration of the heat transfer control elements 400, the melted powder of the snubber first layer 370 duplicates the grain orientation 220 of the blade and a meniscus 386 may be formed at the metallurgical joint 385 or junction where the melted metal powder of the snubber first layer 370 converges with the blade surface 210.

As shown in FIG. 8, in forming a snubber to correspond to a turbine blade 300 having a multiple grain 223 thickness, the metal powder of the snubber first layer 370 is placed on the surface of the turbine blade 210. Optionally, flux may be applied to the metal powder and the blade surface to help control heat transfer.

As shown in FIG. 9, consistent with the system vector settings 405 and the configuration of the heat transfer control elements 400, the melted powder of the snubber first layer 370 duplicates the grain orientation 220 of the blade at the grains closest to the snubber first layer 370. As shown, the melting powder may encompass a portion or fraction 207 of the blade grains 223 while leaving the remaining blade grains 223 undisturbed. The system vectors 405 and heat transfer control elements 400 can be configured so that the fraction 207 of the blade grains influenced or encompassed by the melting metal powder reproduces the blade grain pattern of adjacent blade grains 220/223 with varying fidelity as desired without encompassing all the grains of the blade.

For example, in FIG. 9 the metal powder of the first layer 370 is shown subsumed within the first two blade grains nearest the snubber first layer to form a grain pattern which closely matches the grain pattern of the undisturbed blade grains 223 although not exactly. The unified grain structure formed between the first two blade grains and the snubber first layer 370 may be configured to impart selected mechanical properties as desired.

Further, as shown in FIG. 5B, the blade may have equiaxed grains and at least a portion or fraction 207 of the blade grains 223 are reoriented to conform to a grain pattern in common with the melted metal powder of the snubber first layer 370.

Additionally a meniscus 386 may be formed at the metallurgical joint 385 or junction where the melted metal powder of the snubber first layer 370 converges with the blade surface 210.

As shown in FIG. 5A thru FIG. 9, through the control of which blade grains are influenced or encompassed by the melting metal powder of the snubber layer 370, the metallurgical joint 385 can be selected to be less than a full thickness of the blade wall 210, which preserves the as-cast grain structure 220 the blade wall 210 under the metallurgical joint 385.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
    forming a secondary structure onto a surface of a cast metal component by melting successive layers of metal powder onto the cast metal component using a directed energy beam, wherein the metal powder is provided as a preform having a preformed shape, wherein the metal powder preform includes heat flow control elements, and wherein the melting of the metal powder does not encompass a complete depth of the cast metal component.

2. The method of claim 1 wherein the cast metal component comprises a turbine blade.

3. The method of claim 1 wherein the secondary structure comprises a turbine snubber.

4. A method comprising:
    forming a secondary structure onto a surface of a cast metal component by melting successive layers of metal powder onto the cast metal component using a directed energy beam, wherein the melting of the metal powder does not encompass a complete depth of the cast metal component; and utilizing heat flow control elements to effectuate heat transfer from the directed energy beam to the cast metal component and the secondary structure by pulling heat out of the powder melt out to achieve a preferential grain growth.

5. The method of claim 4 wherein the heat flow control elements comprise energy beam and laser blocking material, and insulating material.

6. The method of claim 5 further comprising applying a system vector in conjunction with the heat flow control elements to control the heat transfer.

7. The method of claim 6 wherein the system vector encompass energy beam parameters including path, intensity, and duration to apply energy to selected locations on or near the cast metal component and the secondary structure.

8. The method of claim 4 wherein the cast metal component comprises a turbine blade.

9. The method of claim 4 wherein the secondary structure comprises a turbine snubber.

10. The method of claim 4 wherein the cast metal component comprises a turbine blade and the secondary structure comprises a turbine snubber.

11. A method of forming a secondary structure onto a turbine blade comprising:

melting successive layers of metal powder onto a wall of the turbine blade using a directed energy beam, wherein the melting does not melt a full thickness of the wall, thereby preserving an as-cast grain structure of the wall under the melting; and controlling, using heat flow control elements, heat transfer of the energy beam so that the melting of the metal powder does not encompass a complete depth of the turbine blade.

12. The method of claim 11 further comprising:

forming the secondary structure in a shape of a turbine blade snubber.

13. The method of claim 11 further comprising:

controlling the heat transfer of the energy beam, applying the heat flow control elements so that the grain structure of at least one layer of the secondary structure is formed to correspond to the grain structure of the turbine blade.

14. The method of claim 13 further comprising:

controlling the heat transfer of the energy beam using system vectors encompassing energy beam parameters including path, intensity, and duration.

15. The method of claim 14 further comprising:

selecting system vectors, selecting heat flow control elements, positioning the heat flow control elements on and about the turbine blade, applying the selected system vectors necessary to generate a grain structure of at least one layer of the secondary structure which corresponds to the grain structure of the turbine blade.

* * * * *